United States Patent [19]

Lindgren

[11] Patent Number: 4,733,504

[45] Date of Patent: Mar. 29, 1988

[54] MULTIPLE-GLAZED HEATED WINDOW

[75] Inventor: Bengt Lindgren, Sollentuna, Sweden

[73] Assignee: Termofrost Sweden AB, Spanga, Sweden

[21] Appl. No.: 935,131

[22] Filed: Nov. 26, 1986

Related U.S. Application Data

[63] Continuation of Ser. No. 763,441, Aug. 1, 1985, abandoned.

[30] Foreign Application Priority Data

Dec. 5, 1983 [SE] Sweden ................................ 8306711

[51] Int. Cl.$^4$ .................. E06B 7/12; G05D 23/24; H02H 5/10
[52] U.S. Cl. ........................................ 52/1; 52/171; 219/522
[58] Field of Search ............................ 52/1, 171, 172; 219/213, 522

[56] References Cited

U.S. PATENT DOCUMENTS

| | | | |
|---|---|---|---|
| 2,557,905 | 6/1951 | Burton et al. | 219/213 |
| 2,608,635 | 8/1952 | Mershon | 52/171 |
| 3,064,110 | 11/1962 | Vogler | 219/213 |
| 3,399,294 | 8/1968 | Theiben | 219/522 |
| 3,710,074 | 1/1973 | Stewart | 52/171 |
| 4,035,608 | 7/1977 | Stromquist et al. | 219/213 X |
| 4,506,137 | 3/1985 | Meister | 52/171 X |
| 4,539,466 | 9/1985 | Yamamoto | 52/171 X |

FOREIGN PATENT DOCUMENTS 991233 6/1976 Canada .
1401075 7/1975 United Kingdom .

Primary Examiner—Alfred C. Perham
Attorney, Agent, or Firm—Nies, Webner, Kurz & Bergert

[57] ABSTRACT

A window for buildings, particularly dwelling houses and office buildings, comprising a frame and two or more glass window-panes, of which the window-pane located nearest a room has an electrically conductive layer applied to the side thereof remote from the room. In accordance with the invention there is provided a control circuit (8) for connection to a voltage source located in the frame (2) of the window (1). Also provided is a thermistor (14) which is in contact with the side of the window-pane (3) remote from the room and which is connected to the aforementioned control circuit (8) and arranged to produce or to influence an electric signal corresponding to the temperature of the window pane (3). The control circuit (8) is arranged to control the supply of current to the electrically conductive layer so that the window-pane (3) can be brought to a given temperature set by a potentiometer (16) connected to the control circuit (8).

3 Claims, 3 Drawing Figures

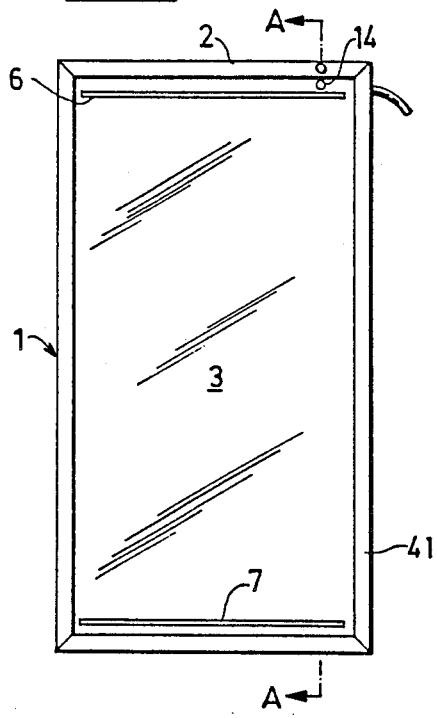
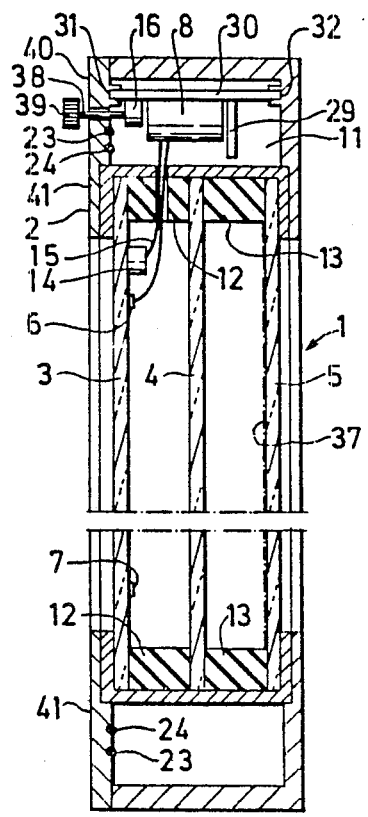
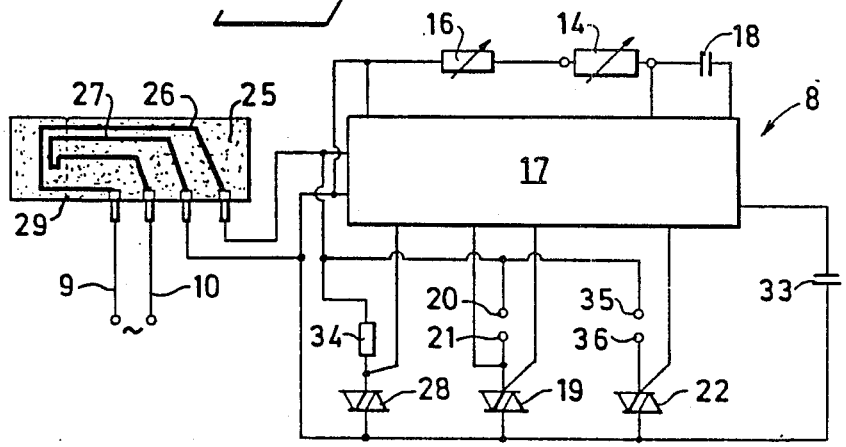

MULTIPLE-GLAZED HEATED WINDOW

This application is a continuation of application Ser. No. 763,441, filed Aug. 1, 1985, now abandoned.

The present invention relates to a window for buildings, particularly for dwelling houses and office buildings.

Window structures for such buildings as dwelling houses and office buildings are normally double glazed or triple glazed. The triple-glazed window has a lower so-called k-value than double-glazed windows and hence triple-glazed windows are used for improved insulation between the building interior and the surroundings. Despite the use of a triple-glazed window, the temperature of the glass window-pane located nearest the room is always relatively low when the outside temperature is low. In countries which experience a cold climate during certain parts of the year, such as Sweden, there is experienced as a result hereof downward flows of cold air, which cool the interior air moving past the window-pane located nearest the room, causing this air to sink down the wall to floor level.

This problem is particularly acute in buildings which have a large total window-area, and particularly in buildings where a greater part of the facade thereof comprises glass.

It has earlier been proposed to use window designs in which the window-pane nearest the room, is provided with an electrically heated layer. Although such an arrangement overcomes the problems caused by downwardly sliding cold air, it creates other problems.

More often than not a building is heated by means of a thermostat control system, in which one or more thermostats sense the temperature of a room and control the supply of energy to heating devices as required, in dependence upon the sensed temperature.

Temperature regulation effected by controlling the supply of current to a window heated by an electrically conductive layer in response to sensed changes in ambient temperature is not very effective, since the temperature of a room changes very slowly while the window becomes warm very quickly. On the other hand, when the room temperature exceeds the temperature setting of the thermostats, the window is not heated at all.

Another problem is that the outer windows of buildings are exposed to varying weather conditions, such as radiation from the sun, high winds, rain, etc., and are hence heated to different temperatures even when the inner temperature is the same in the building.

The need of heating windows also varies with the outside temperature and the weather in general.

These problems are fully solved by means of the invention. The invention also provides a window design which can be used to heat a building completely or partially.

Thus, the present invention relates to a window for buildings, particularly dwelling houses and office buildings, including a frame and two or more glass window-panes, i.e. multiple-glazed windows, where the pane located nearest the room has an electrically conductive layer arranged on the side thereof distal from a room served by the window, and is characterized in that a control circuit for connection to a voltage source is arranged in the window frame; that a thermistor is mounted in contact with said distal side of the window pane and connected to said control circuit and arranged to produce or to influence an electric signal corresponding to the temperature of said window pane; and in that the control circuit is arranged to control the supply of current to the electrically conductive layer to enable the window pane to be brought to a given temperature set by a potentiometer connected to said control circuit.

Thus, with a window structure according to the invention each individual window has a given temperature irrespective of weather conditions and room temperatures, provided that the outside temperature and the temperature within the room served by the window is such that the window pane lying nearest the room is able to attain a temperature which lies beneath the given or pre-set temperature.

Because a thermistor is mounted against the window pane lying nearest the room, hereinafter referred to as the inner pane, and a control circuit is provided in the window frame for controlling the supply of current to said inner pane, and a potentiometer is provided for setting the aforesaid given temperature, the heating of each such window is effected independently of the heating of the other windows. This means that each window is heated to a given temperature, irrespective of weather conditions, such as radiation from the sun, rain, high winds against the window in question, etc. In the case of a building where, for example, a facade thereof is constructed of glass, all the inner panes of the window structure will thus be maintained at the pre-set temperature, even in varying meteorological conditions. Such window structures can be readily installed, since each window per se incorporates all the electronic devices required for heating the window. The windows need only be connected to the mains supply.

The aforesaid potentiometer may be integrated with the control circuit and therewith located within the internal space of the window frame, although it may also be placed so that a knob for adjusting the temperature can be reached from outside the window frame.

In accordance with a further embodiment of the invention, sufficient power can be applied to the inner panes in a building to heat the building by means of the energy supplied to said window panes. Naturally, the power required depends upon the relative area of the windows in the building, the outside temperature, etc., although tests and calculations have shown that buildings having a relatively large window area can be heated by means of the windows when the energy supplied is 50–150 W/m$^2$ window area. It can be mentioned by way of example that the energy requirement for maintaining the inner pane of a triple-glazed window at a surface temperature of $+20°$ C. at an outer temperature of $-20°$ C. is approximately 120 W/m$^2$.

When heating a building or room by means of heating the windows thereof, it has been found suitable to set the control circuits of said windows so that the inner window panes are maintained at a temperature which exceeds the desired room temperature by $1°–10°$ C. It will be understood, that the aforesaid temperature is dependent upon the relative window area and room size, and on the outside temperature and the desired inner temperature. In this respect, it has been surprisingly found that the total energy required for heating a building is drastically reduced. Calculations have shown that the energy requirement can be reduced by up to 75% in buildings having large relative window areas. The prime reason for this is that the windows present a large area emitting radiation heat and convection heat of low temperature, for example only a few degrees above room temperature, as distinct from a radiator which presents but a small surface area of high temperature, for example a direct-heating electrical radiator. At the same time the aforementioned cold air-slides are avoided. These cold air-slides namely give the impression of a draught in the room, and hence the room temperature needs to be raised in order to be comfortable.

The effect of such cold air-slides is often counteracted by installing radiators beneath windows. Such an arrangement, however, means that a person sitting, for example, adjacent the window receives the hot radiation from the radiator and also cold air from the window. When the heating system according to the invention is used there is also achieved a uniform temperature climate adjacent the windows. Cold air-slides also cool the air in the floor area of a room, and hence the average temperature of the room must be raised, in order for the lower part of the room to be maintained at the required temperature.

In accordance with one embodiment of the invention, the window pane located outside the window pane carrying the electrically conductive layer is provided with a layer which reflects infra-red radiation. This design is highly advantageous, particularly when the windows are used to heat the building. This reflective layer will reflect radiation heat from the electrically conductive layer of the window structure, and will also reflect heat away from the walls of the room, and the furniture therein, etc..

An exemplary embodiment of the invention will now be described in more detail with reference to the accompanying drawing, in which FIG. 1 is a vertical view of a window according to the invention;

FIG. 2 is a sectional view taken on the line A—A in FIG. 1;

FIG. 3 illustrates schematically a circuit diagram of a control circuit for the illustrated window.

In FIG. 1 there is illustrated a window 1 according to the invention, which comprises a frame 2 and three window panes 3,4,5. The window pane 3 located nearest a room served by the window 1 has applied to the side thereof remote from the room an electrically conductive layer, for example a tim-oxide layer, which is transparent and which is connected at its upper and lower short sides to collecting conductors 6,7. The collecting conductors 6,7 are connected to a control circuit 8. In turn, the control circuit 8 is intended for connection, through conductors 9,10, to a mains voltage, for example 220 volt.

The window frame 2 is suitably constructed from extruded aluminium, and is designed so that a cavity 11 is found in the frame. The window frame may comprise a plurality of parts of greatly differing design, and hence the window frame illustrated in FIG. 2 shall only be seen schematically as having a frame 2. The frame 2 has mounted therein three glass panes, of which the pane 3 is heated.

The heated pane 3, and also the outermost pane 5, are suitably made of tempered glass, while the centre window pane 4 is made of window glass. Insulating means and spacing means 12,13 are arranged between the window panes 3,4,5.

In accordance with the invention, a thermistor 14 is arranged in contact with the side of the inner pane 3 remote from the room. The thermistor 14 is of a conventional kind and is arranged to produce an electric signal corresponding to the temperature of the window pane 3. The thermistor 14 is suitably bonded to the glass with the aid of an adhesive having the same emissivity as the glass. Preferably, the thermistor 14 is of the type designated NTC. The thermistor 14 is connected to the control circuit 8 via conductor 15.

A potentiometer 16 is also connected to the control circuit. The control circuit 8 is arranged to control the supply of current to the electrically conductive layer, so that a temperature set by means of the potentiometer 16 is reached, this temperature being sensed by means of the thermistor 14.

FIG. 3 illustrates schematically a circuit diagram of the control circuit 8. The design of the control circuit 8 is of no significance with respect to the present invention, and hence part of the circuit has been illustrated in block schematic form.

The block 17 in FIG. 3 identifies a hybrid circuit to which the thermistor 14 and the potentiometer 16 are connected via a capacitor 18. The hybrid circuit 17 is arranged to ignite and extinguish a plurality of triactype semiconductors in response to the voltage drop over the potentiometer 16 and the thermistor 14. The electrically conductive layer is connected to the triac 19 via connections 20,21. In accordance with one preferred embodiment of the invention, heating cables 23,24 are connected to a further triac 22, via connections 35,36. The heating cables 23,24 are arranged to lie against that part of the frame 2 located nearest the room, in order to heat said room. In this respect, the control circuit 8 is arranged to supply voltage to the heating cables for the period of time over which voltage is applied to the electric layer on the inner window pane 3.

The control circuit 8 is of conventional design in those respects mentioned hitherto.

In accordance with one preferred embodiment, the control circuit may also be designed to include a current-sensing means of the kind described in Swedish Patent application 82,05534-4, now abandoned but provisionally published on Aug. 7, 1984. My U.S. Pat. No. 4,562,509 includes such a current sensing means.

The current-sensing means is arranged to sense whether or not current flows through the inner pane 3 when voltage is applied to the connections 20,21 associated with the collecting conductors. When the thermistor and the potentiometer have the resistance such that the control circuit applies voltage to the collecting conductors but, at the same time, no current flows therein, the current-sensing means is arranged to increase the current strength through a conventional porcelain fuse 25 to which electric conductors 26,27 are connected.

The current-sensing means and the aforesaid fuse are provided because if a window pane cracks the voltage must be quickly broken, where the pole distance at the breaking location shall be at least 3 mm.

When a window pane cracks and the voltage is applied to the collecting conductors, the potential is changed on a transistor in the hybrid circuit 17, which results in a triac 28 opening. As will be seen from FIG. 3, this results in a high reduction in the resistance between the conductors 26 and 27, thereby to greatly increase the current through the fuse 25. This increase in current results in the powerful generation of heat in the porcelain fuse 25, the design of which includes a mechanical weakening in the form of a score-line, such as a V-shaped groove 29 or the like. The heat generated is concentrated at the groove 29, which causes the porcelain fuse 25 to be divided along the groove 29, as a result of thermal stresses in the porcelain. This causes the current to be broken between the voltage sources, i.e. the conductors 9,10 and the control circuit. The conductors on the porcelain fuse of the FIG. 3 embodiment are spaced at a mutual distance apart such that the current circuit is broken in two-pole fashion, with a break distance of at least 3 mm.

As will be understood, the current-sensing means incorporated in the control circuit may have any suitable form for increasing the current in the porcelain fuse. Such modifications, and also modifications relating to the design of the control circuit in general, are included in the scope of the present invention.

The porcelain fuse 25 of the FIG. 3 embodiment is approximately of natural size, enabling it to be mounted suitably on a circuit card 30 carrying the hybrid circuit in the frame 2. The potentiometer 16 can also be carried by the circuit card 30. The circuit card 30 may be suitably inserted in channels 31,32 in the window frame 2.

In FIG. 3, the reference 33 identifies a capacitor and the reference 34 a resistance.

As beforementioned, in accordance with a preferred embodiment of the invention the side of the outermost window pane 5 facing the room is coated with an infra-red reflecting layer, indicated by the broken line 37. It will be understood, however, that the intermediate window pane 4 may be provided with said infra-red reflecting layer instead of the window pane 5.

The potentiometer 16 is suitably provided with a rod 38 which extends through the window frame and which carries on its outer end a knob 39 by means of which the setting of the potentiometer can be adjusted. To this end, a temperature scale, not shown, is arranged on an outer surface 40 of the window frame.

In addition hereto, a section 41 of the window frame 2 facing in towards the room is suitably removable to facilitate the fitting and servicing of the electrical devices.

In the aforegoing there has been described, inter alia, a selected embodiment of the invention. It will be understood, however, that various modifications can be made. For example, the window may be a double-glazed window intead of a triple-glazed window. Further, the thermistor may be placed at a location different to that illustrated, and more window panes may be heated, etc., without departing from the scope of the invention.

Thus, the present invention is not restricted to the aforedescribed embodiment, and modifications can be made within the scope of the following claims.

I claim:

1. A window for buildings, particularly dwelling houses and office buildings, comprising: a frame and at least two window panes; a first of said panes, the window pane on the side of the window which is intended to be located nearest the interior of a room, includes, applied directly on the surface of said side of said first pane remote from the room, an electrically conductive layer; a control circuit (8) for connection to a voltage source is mounted in the frame (2) of the window (1); a thermistor (14) is mounted between two of said panes in direct contact with the surface of said side of said first pane (3) intended to face away from the room, said thermistor (14) being connected to said control circuit (8) and being arranged in said circuit to produce an electric signal condition corresponding to the temperature of said first window-pane (3); said control circuit (8) includes a potentiometer and is arranged to supply and control the current to said electrically conductive layer so that said first window pane (3) can be brought to a given temperature as set by said potentiometer (16); and a second of said window panes (4,5), located toward and closer to the side of the window (1) intended to be located exterior of the room than is said first window pane (3) which carries the electrically conductive layer, having an infra-red reflecting layer (37) applied on the surface thereof facing said first pane and intended to face toward the interior of a room in which the window is to be installed.

2. A window according to claim 1, characterized in that the control circuit (8) includes and is connected to heating cables (23,24) which abut the part of the frame (2) located nearest the room, and in that the control circuit (8) is arranged to apply voltage to the heating cables (23,24) for the time period over which a voltage is applied to the electric layer on said window-pane (3).

3. A window according to claim 1, characterized in that the control circuit (8) is designed to incorporate a current-sensing means arranged to sense whether or not current flows through said window-pane (3) when voltage is applied to collecting conductors (6,7) associated with said electric layer, said current-sensing means being arranged to increase the current strength through a conventional porcelain fuse (25), on which a pair of bi-polar electric conductors (26,27) are connected, when current does not flow through the electric layer.

* * * * *